(12) United States Patent
Minei et al.

(10) Patent No.: US 11,167,639 B2
(45) Date of Patent: Nov. 9, 2021

(54) HEAD-UP DISPLAY DEVICE AND MOUNTING STRUCTURE FOR HEAD-UP DISPLAY DEVICE

(71) Applicant: Toyota Jidosha Kabushiki Kaisha, Toyota (JP)

(72) Inventors: Taichi Minei, Toyota (JP); Shigeto Muramatsu, Toyota (JP); Yasunobu Nagata, Toyota (JP); Norihisa Nomura, Ogaki (JP); Takashi Tsuboi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 94 days.

(21) Appl. No.: 16/789,894

(22) Filed: Feb. 13, 2020

(65) Prior Publication Data
US 2020/0269694 A1 Aug. 27, 2020

(30) Foreign Application Priority Data
Feb. 26, 2019 (JP) .............................. JP2019-033234

(51) Int. Cl.
*B60K 35/00* (2006.01)
*G02B 27/01* (2006.01)
*B62D 25/08* (2006.01)

(52) U.S. Cl.
CPC ............ *B60K 35/00* (2013.01); *B62D 25/081* (2013.01); *G02B 27/0101* (2013.01); *G02B 27/0149* (2013.01); *B60K 2370/1529* (2019.05); *B60K 2370/816* (2019.05)

(58) Field of Classification Search
CPC ........ G02B 27/0149; G02B 2027/0154; G02B 2027/0167; B60K 35/00; B60K 2370/1529; B60K 2370/816
See application file for complete search history.

(56) References Cited

U.S. PATENT DOCUMENTS

2010/0046082 A1\* 2/2010 Croy .................. G02B 27/0149
359/632
2015/0091331 A1 4/2015 Takei et al.
2017/0059864 A1 3/2017 Takahashi
(Continued)

FOREIGN PATENT DOCUMENTS

| JP | 2010-064708 A | 3/2010 |
| JP | 2010-064709 A | 3/2010 |
| JP | 2014-156219 A | 8/2014 |

OTHER PUBLICATIONS

Office Action dated Nov. 2, 2020 in U.S. Appl. No. 16/791,164.
(Continued)

*Primary Examiner* — Ryan D Howard
(74) *Attorney, Agent, or Firm* — Dinsmore & Shohl LLP (57) ABSTRACT

A head-up display device includes a casing provided inside an instrument panel and provided with a concave mirror configured to project image information emitted from a light source onto a front windshield glass. In the head-up display device, a retraction portion is provided on a lower side of the concave mirror in a vehicle up-down direction and configured to allow the concave mirror to move downward in the vehicle up-down direction when an impact load is input to the concave mirror from an upper side in the vehicle up-down direction.

10 Claims, 5 Drawing Sheets

(56) References Cited

U.S. PATENT DOCUMENTS

2018/0045958 A1 2/2018 Kuzuhara et al.
2020/0271926 A1 8/2020 Minei et al.

OTHER PUBLICATIONS

Notice of Allowance dated Feb. 26, 2021 in U.S. Appl. No. 16/791,164.
U.S. Appl. No. 16/791,164, filed Feb. 14, 2020; Inventors: Taichi Minei et al.

* cited by examiner

HEAD-UP DISPLAY DEVICE AND MOUNTING STRUCTURE FOR HEAD-UP DISPLAY DEVICE

CROSS-REFERENCE TO RELATED APPLICATIONS

This application claims priority to Japanese Patent Application No. 2019-033234 filed on Feb. 26, 2019, which is incorporated herein by reference in its entirety including the specification, drawings and abstract.

BACKGROUND

1. Technical Field

The disclosure relates to a head-up display device and a mounting structure for a head-up display device.

2. Description of Related Art

Japanese Unexamined Patent Application Publication No. 2010-064709 (JP 2010-064709 A) describes a technique regarding a head-up display device in which a fixing member is provided that protrudes from a lower part of a side wall of a housing (hereinafter referred to as "casing") and that is connected to a bracket provided on a vehicle body. The fixing member includes a support portion supported by the bracket, a fastening portion fastened to the bracket, and a connecting portion that connects the support portion and the side wall of the casing. The connecting portion is provided with a groove and a bottom side of the groove serves as a thin portion.

The thin portion is configured to be broken when a predetermined external force is applied to the casing, and the connection between the casing and the bracket is released with the breakage of the thin portion. Thus, when the thin portion is broken, the head-up display device moves downward in a vehicle up-down direction. Thereby, a front windshield and the like move downward in the vehicle up-down direction, which enables absorption of an impact energy.

Japanese Unexamined Patent Application Publication No. 2014-156219 (JP 2014-156219 A) describes a technique regarding a head-up display device in which a plurality of fragile portions with a smaller thickness (hereinafter referred to as "thin portions") are provided in corners, steps, and the like of a lower case constituting a lower part of a casing. In the head-up display device, when an impact load is input from above a vehicle, the thin portions are broken and the casing is crushed so that an impact energy can be absorbed.

As described above, in the related art, the thin portions are provided in the fixing member supporting the casing of the head-up display device or in the lower case of the head-up display device. Thus, by causing the thin portions to be broken, it is possible to absorb the impact energy.

SUMMARY

In general, a light source unit that emits image information is disposed at a lower part (in the lower case) of the head-up display device. Therefore, when the thin portions are provided to make the fixing member for the head-up display or the lower case of the head-up display device fragile as described above, the image information emitted from the light source unit may jitter due to vibration of the vehicle during traveling, such as road surface input.

The disclosure provides a head-up display device and a mounting structure for a head-up display device that suppress jitters of image information during traveling of a vehicle and can absorb an impact energy when an impact load is input from above the vehicle.

A first aspect of the disclosure relates to a head-up display device. The head-up display device includes a casing provided inside an instrument panel and provided with a concave mirror configured to project image information emitted from a light source onto a front windshield glass. In the head-up display device, a retraction portion is provided on a lower side of the concave mirror in a vehicle up-down direction and configured to allow the concave mirror to move downward in the vehicle up-down direction when an impact load is input to the concave mirror from an upper side in the vehicle up-down direction.

In the head-up display device of the above aspect, the casing of the head-up display device is provided inside the instrument panel, and the casing is provided with the concave mirror that projects the image information emitted from the light source onto the front windshield glass.

Suppose, as a comparative example, the concave mirror is held as it is and does not move downward in the vehicle up-down direction when the impact load is input to the concave mirror from the upper side in the vehicle up-down direction. In this case, deformation of the casing of the head-up display device is suppressed by a reaction force of the concave mirror.

When the deformation of the casing is suppressed as in the comparative example, downward movement (deformation) of the front windshield glass, the instrument panel, and the like in the vehicle up-down direction is also suppressed. Thus, in the head-up display device of the comparative example, there is a possibility that an impact energy cannot be absorbed sufficiently when the impact load is input from the upper side in the vehicle up-down direction.

In contrast, in the above aspect, the retraction portion that allows the concave mirror to move downward in the vehicle up-down direction is provided on the lower side of the concave mirror in the vehicle up-down direction. Thereby, when the impact load is input to the concave mirror from the upper side in the vehicle up-down direction, the concave mirror can move downward in the vehicle up-down direction.

That is, in the above aspect, the front windshield glass, the instrument panel, and the like can be deformed downward in the vehicle up-down direction without being intercepted by the concave mirror. Thus, in the above aspect, by moving the concave mirror downward in the vehicle up-down direction to sufficiently deform the front windshield glass, the instrument panel, and the like, it is possible to effectively absorb the impact energy.

Thus, unlike the head-up display device configured such that the casing is broken at a fragile portion to absorb the impact energy, the front windshield glass, the instrument panel, and the like are deformed to absorb energy in the above aspect. Accordingly, in the above aspect, it is possible to secure rigidity of the casing itself of the head-up display device. As a result, in the above aspect, the head-up display device can suppress jitters of the image information during traveling of the vehicle.

Thus, in the above aspect, the head-up display device can suppress jitters of the image information during traveling of the vehicle and absorb the impact energy when the impact load is input from the upper side in the vehicle up-down direction.

In the head-up display device according to the above aspect, the casing may include an upper case constituting an upper part of the casing and a lower case constituting a lower part of the casing. The retraction portion may be provided at a position including an opening that is provided in a lower wall of the lower case.

In the head-up display device of the above aspect, the casing of the head-up display device includes the upper case constituting the upper part of the casing and the lower case constituting the lower part of the casing. The retraction portion that allows the concave mirror to move downward in the vehicle up-down direction includes the opening provided in the lower wall of the lower case. Thus, by providing the opening in the lower wall of the lower case, the concave mirror can pass through the opening when the casing is deformed and the concave mirror moves downward in the vehicle up-down direction.

Here, the casing of the head-up display device is deformed when the impact load is input from the upper side in the vehicle up-down direction. That is, the casing is crushed (deformed) from the upper part side toward the lower part side. At this time, the concave mirror attempts to move downward in the vehicle up-down direction with the deformation of the casing. Since the concave mirror moves downward in the vehicle up-down direction through the opening provided in the lower wall of the lower case, the casing can be deformed without being intercepted by the concave mirror.

That is, the head-up display device of the above configuration provides an effect that the concave mirror can be moved downward in the vehicle up-down direction through the opening provided in the lower case so as to deform the casing.

In the head-up display device according to the above aspect, the casing may further include a first wall constituting a part of the lower case and extending along the vehicle up-down direction, a second wall constituting a part of the upper case, extending along the vehicle up-down direction, and overlapping the first wall from outside, and a connecting tool connecting an upper end of the first wall in the vehicle up-down direction and a lower end of the second wall in the vehicle up-down direction and configured to be broken when the impact load is input to the casing from the upper side in the vehicle up-down direction.

In the head-up display device of the above aspect, the first wall constituting a part of the lower case is formed to extend along the vehicle up-down direction. The second wall constituting a part of the upper case is formed to extend along the vehicle up-down direction, and is arranged so as to overlap the first wall of the lower case from outside. The upper end of the first wall of the lower case in the vehicle up-down direction and the lower end of the second wall of the upper case in the vehicle up-down direction are connected with each other with the connecting tool.

Here, the connecting tool is configured to be broken when the impact load is input to the casing of the head-up display device from the upper side in the vehicle up-down direction. As described above, the second wall of the upper case is disposed so as to overlap the first wall of the lower case from outside, and the connecting tool connects the upper end of the first wall of the lower case with the lower end of the second wall of the upper case. Thus, when the connecting tool is broken, the upper case moves toward the lower case (downward in the vehicle up-down direction). As a result, the concave mirror moves downward in the vehicle up-down direction.

That is, in the above aspect, a configuration is adopted in which the lower case and the upper case are overlapped and connected in a shear direction with respect to the input load, and the connecting tool is broken. Therefore, the volume of the casing can be reduced. As a result, the amounts of deformation (deformation strokes) of the front windshield glass, the instrument panel, and the like are increased, thereby increasing the amount of impact energy to be absorbed.

Thus, unlike the head-up display device configured such that the casing is broken at the fragile portion to absorb the impact energy, the front windshield glass, the instrument panel, and the like are deformed to absorb the impact energy when the impact load is input from the upper side in the vehicle up-down direction, in the above aspect. That is, in the above aspect, the rigidity of the casing itself of the head-up display device can be secured.

In the head-up display device according to the above aspect, a rib may protrude downward in the vehicle up-down direction from an inner edge of the opening.

In the head-up display device of the above aspect, the rib protrudes downward in the vehicle up-down direction from the inner edge of the opening, so that the rigidity around the opening is improved. Thereby, it is possible to suppress the deformation of the opening due to the deformation of the casing.

That is, the head-up display device of the above configuration provides an effect that the deformation of the opening is suppressed and the concave mirror can be moved downward in the vehicle up-down direction through the opening.

In the head-up display device according to the above aspect, the concave mirror may be provided in the lower case.

In the head-up display device according to the above aspect, the concave mirror may have a shape that bulges in a convex shape toward a front of a vehicle in a plan view of the vehicle. At least a front part of the opening in the vehicle front-rear direction may have a curved shape that bulges in a convex shape toward the front of the vehicle in the plan view of the vehicle.

In the head-up display device according to the above aspect, the lower case may have higher rigidity than the upper case.

A second aspect of the disclosure relates to a mounting structure for a head-up display device. The mounting structure includes: a head-up display device including a casing that is provided inside an instrument panel and is provided with a concave mirror configured to project image information emitted from a light source onto a front windshield glass; and a cowl panel extending along a vehicle width direction at a front part of the front windshield glass in a vehicle front-rear direction, and covering a front part of the head-up display device in the vehicle front-rear direction from outside the head-up display device. In the mounting structure, a lower wall of the casing of the head-up display device is provided with an opening that allows the concave mirror to move downward in a vehicle up-down direction when an impact load is input to the concave mirror from an upper side in the vehicle up-down direction. The cowl panel includes a facing wall constituting a part of the cowl panel, disposed below the lower wall in the vehicle up-down direction, and disposed such that a retraction space is secured between the facing wall and the lower wall, the retraction space allowing the concave mirror that has passed through the opening to move downward in the vehicle up-down direction.

In the mounting structure of the above aspect, the head-up display device is provided inside the instrument panel. The casing of the head-up display device is provided with the concave mirror that projects the image information emitted from the light source onto the front windshield glass.

Meanwhile, at the front part of the front windshield glass in the vehicle front-rear direction, the cowl panel extends along the vehicle width direction and covers, from outside, the front part of the head-up display device in the vehicle front-rear direction.

Here, in the above aspect, the lower wall of the casing of the head-up display device is provided with the opening. The opening allows the concave mirror to move downward in the vehicle up-down direction when the impact load is input to the concave mirror from the upper side in the vehicle up-down direction. The facing wall constituting a part of the cowl panel and provided below the lower wall of the casing of the head-up display device in the vehicle up-down direction secures, between the lower wall of the casing and the facing wall, the retraction space that allows the concave mirror that has passed through the opening to move downward in the vehicle up-down direction. That is, in the above aspect, the retraction space that allows the concave mirror that has passed through the opening to move downward in the vehicle up-down direction is provided between the lower wall of the casing of the head-up display device and the facing wall of the cowl panel.

Thus, since the retraction space is provided between the lower wall of the casing of the head-up display device and the facing wall of the cowl panel, the concave mirror 80 can accordingly move further downward in the vehicle up-down direction, compared to the case where the retraction space is not provided. As a result, the amounts of downward deformation of the front windshield glass, the instrument panel, the cowl panel, and the like in the vehicle up-down direction increase, thereby increasing the amount of impact energy to be absorbed accordingly.

As described above, the mounting structure of the second aspect provides an effect that jitters of the image information during traveling of the vehicle can be suppressed and the impact energy can be absorbed when the impact load is input from the upper side in the vehicle up-down direction.

In the mounting structure according to the above aspect, the facing wall may include a deflection face configured to convert a downward movement of the concave mirror in the vehicle up-down direction into a rearward movement in the vehicle front-rear direction.

In the mounting structure of the above aspect, the facing wall of the cowl panel is provided with the deflection face. The deflection face is configured to convert the downward movement of the concave mirror in the vehicle up-down direction into the rearward movement in the vehicle front-rear direction. The facing wall of the cowl panel is provided below the lower wall of the casing of the head-up display device in the vehicle up-down direction, and as described above, the retraction space is provided between the lower wall of the casing and the facing wall of the cowl panel.

Here, in order to increase the amounts of downward deformation of the front windshield glass, the instrument panel, the cowl panel, and the like in the vehicle up-down direction, it is only necessary to set the retraction space to be large. In other words, it is only necessary to largely separate the lower wall of the casing and the facing wall of the cowl panel. In this case, however, the size of the cowl panel increases and the weight of the vehicle increases accordingly.

In contrast, in the above aspect, the facing wall of the cowl panel is provided with the deflection face, and the deflection face is configured to convert the downward movement of the concave mirror in the vehicle up-down direction into the rearward movement in the vehicle front-rear direction. As a result, the front windshield glass, the instrument panel, the cowl panel, and the like can be effectively deformed downward in the vehicle up-down direction with the retraction space having a minimum necessary length in the vehicle up-down direction.

In the mounting structure according to the above aspect, a first cowl reinforcement and a second cowl reinforcement may be attached to the cowl panel, with the head-up display device interposed between the first cowl reinforcement and the second cowl reinforcement, on a rear side of the cowl panel in the vehicle front-rear direction. The head-up display device may include a first fixing portion that is fixed to the first cowl reinforcement and a second fixing portion that is fixed to the second cowl reinforcement.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a head-up display device according to an embodiment of the disclosure will be described with reference to the drawings. Note that an arrow FR appropriately shown in the drawings indicates a front side in a vehicle front-rear direction, and an arrow UP indicates an upper side in a vehicle up-down direction. An arrow OUT indicates an outer side in a vehicle width direction.

Overall Configuration

Figure 1:
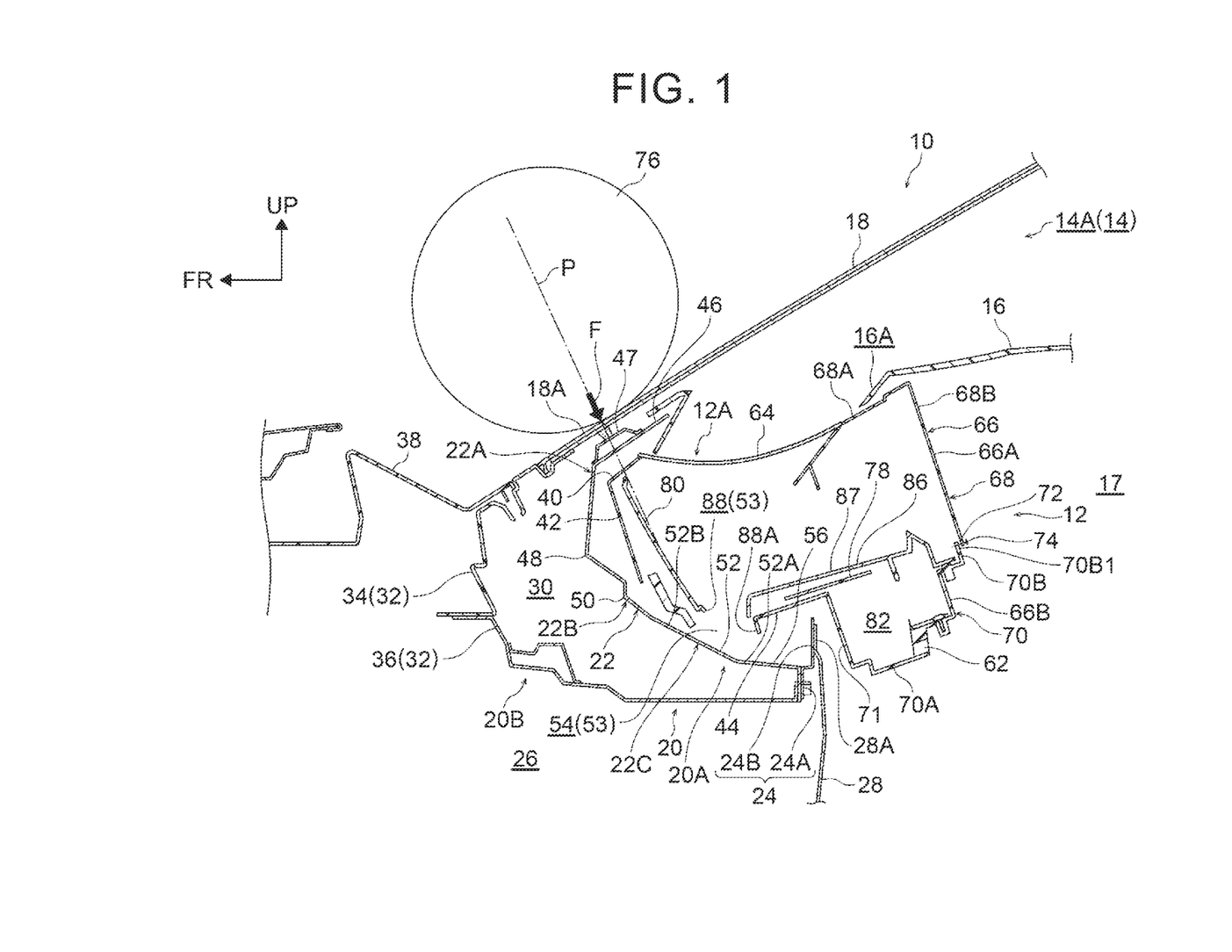
FIG. 1 is a sectional view of a front part of a cabin of a vehicle on which a head-up display device according to an embodiment is mounted, taken along a vehicle up-down direction and a vehicle front-rear direction.

First, a vehicle 10 on which a head-up display device 12 is mounted will be described. FIG. 1 is a sectional view of a front part 14A of a cabin 14 of the vehicle 10, taken along the vehicle up-down direction and the vehicle front-rear direction. As shown in FIG. 1, an instrument panel 16 is provided at the front part 14A of the cabin 14 of the vehicle 10.

Although not shown, the instrument panel 16 is attached to a generally columnar instrument panel reinforcement extending between front pillars provided at both ends of the vehicle 10 in the vehicle width direction, and covers a steering column, etc. from an upper side in the vehicle up-down direction.

A front windshield glass 18 is provided above the instrument panel 16. The front windshield glass 18 is supported by a cowl 20 provided forward of the instrument panel 16 so as to extend along substantially the entire region of the vehicle width, upper portions of the front pillars disposed at both ends of the vehicle 10 in the vehicle width direction, and a front header panel (not shown) provided on the upper side of the front pillars so as to extend along the vehicle width direction.

Here, for example, the cowl 20 includes a cowl panel 22 made of a steel sheet. The cowl panel 22 covers a front part 12A of the head-up display device 12 from an outside of the head-up display device 12 and constitutes a rear part 20A of the cowl 20. The cowl panel 22 is welded (connected) to an upper end 28A of a dash panel 28 via a bracket 24 etc. having a crank shape in a side view of the vehicle. The dash panel 28 is made of a steel sheet, extends in both the vehicle up-down direction and the vehicle width direction, and separates a power unit room 26 accommodating a power unit of the vehicle 10 from the cabin 14.

Further, a front part 20B of the cowl 20 is provided with a cowl panel 32 that form, together with the cowl panel 22, a closed section 30 in the side view of the vehicle. Here, the "closed section 30" need not necessarily have a completely closed section structure.

The cowl panel 32 includes a cowl upper panel 34 that constitutes an upper part of the cowl panel 32 and is made from resin and a cowl lower panel 36 that constitutes a lower part of the cowl panel 32 and is made of metal, for example. The cowl upper panel 34 forms a part of a cowl louver 38 provided on the front side of the front windshield glass 18 in the vehicle front-rear direction.

The cowl panel 22 is formed so as to cover the front part 12A of the head-up display device 12 from the outside of the head-up display device 12 as described above. Thus, the cowl panel 22 is formed so as to face an upper wall 40, a side wall 42, and a lower wall 44 of the head-up display device 12, and has a generally C shape with its rear part in the vehicle front-rear direction opened in the side view of the vehicle.

Specifically, the upper part 22A of the cowl panel 22 is provided with a support portion 46 that faces the upper wall 40 of the head-up display device 12 and supports a lower end 18A of the front windshield glass 18 from a lower side in the vehicle up-down direction. The support portion 46 is provided with a joint portion 47 that joins the front windshield glass 18 to the cowl panel 22.

Further, at a center part 22B of the cowl panel 22 in the vehicle up-down direction, bent portions 48, 50 are provided so as to be arranged side by side in an up-down direction of the cowl panel 22. The bent portions 48, 50 face the side wall 42 of the head-up display device 12 and are bent toward the front of the vehicle. The cowl panel 22 can be bent toward the front of the vehicle with the bent portions 48, 50 serving as starting points. As described above, the cowl panel 22 is provided with the bent portions 48, 50 and is bent with the bent portions 48, 50 serving as the starting points, so that an impact energy can be effectively absorbed with deformation of the cowl panel 22.

A lower part 22C of the cowl panel 22 is provided with a facing wall 52 facing the lower wall 44 of the head-up display device 12. The facing wall 52 is tilted downward in the vehicle up-down direction as extending toward a rear of the vehicle. A retraction space 54 constituting a part of a retraction portion 53 is provided between the facing wall 52 and the lower wall 44 of the head-up display device 12 described later. In addition, at a rear part 52A of the facing wall 52, a deflection face 56 is provided. The deflection face 56 is formed so as to be tilted at a gentler angle with respect to a horizontal plane compared to a front part 52B of the facing wall 52.

A lower part 24A of the bracket 24 described above is fastened to a rear end of the facing wall 52 of the cowl panel 22. An upper part 24B of the bracket 24 is welded to the upper end 28A of the dash panel 28. The lower wall 44 of the head-up display device 12 is provided with a step 71 in order to avoid interference with the upper part 24B of the bracket 24 and the upper end 28A of the dash panel 28. However, the step 71 is not necessarily required.

Figure 2:
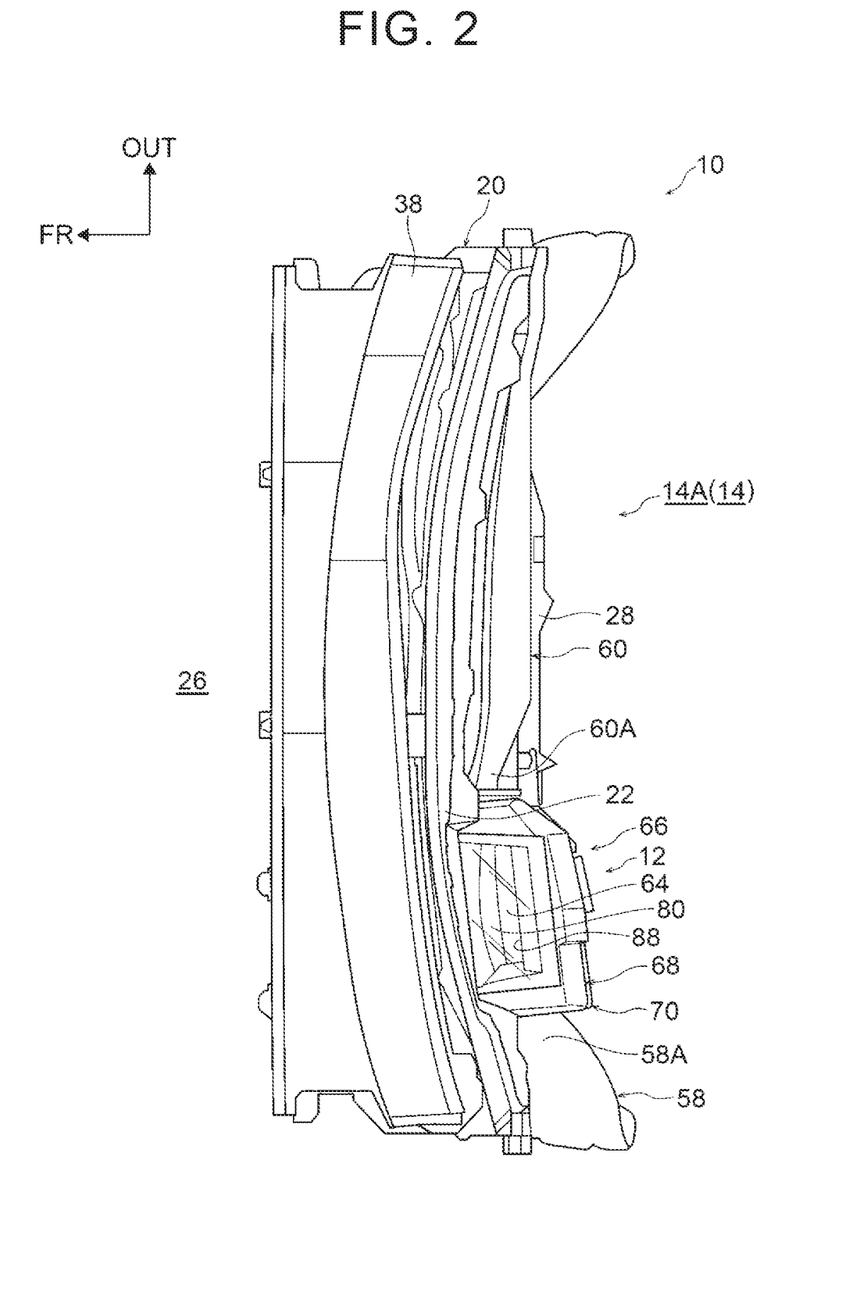
FIG. 2 is a plan view of the front part of the cabin of the vehicle on which the head-up display device according to the embodiment is mounted.

FIG. 2 shows a plan view of the front part 14A of the cabin 14 of the vehicle 10, with the instrument panel 16 and the front windshield glass 18 shown in FIG. 1 omitted. In FIG. 2, the vehicle 10 is a so-called left-hand drive vehicle, but may be a right-hand drive vehicle.

Figure 3:
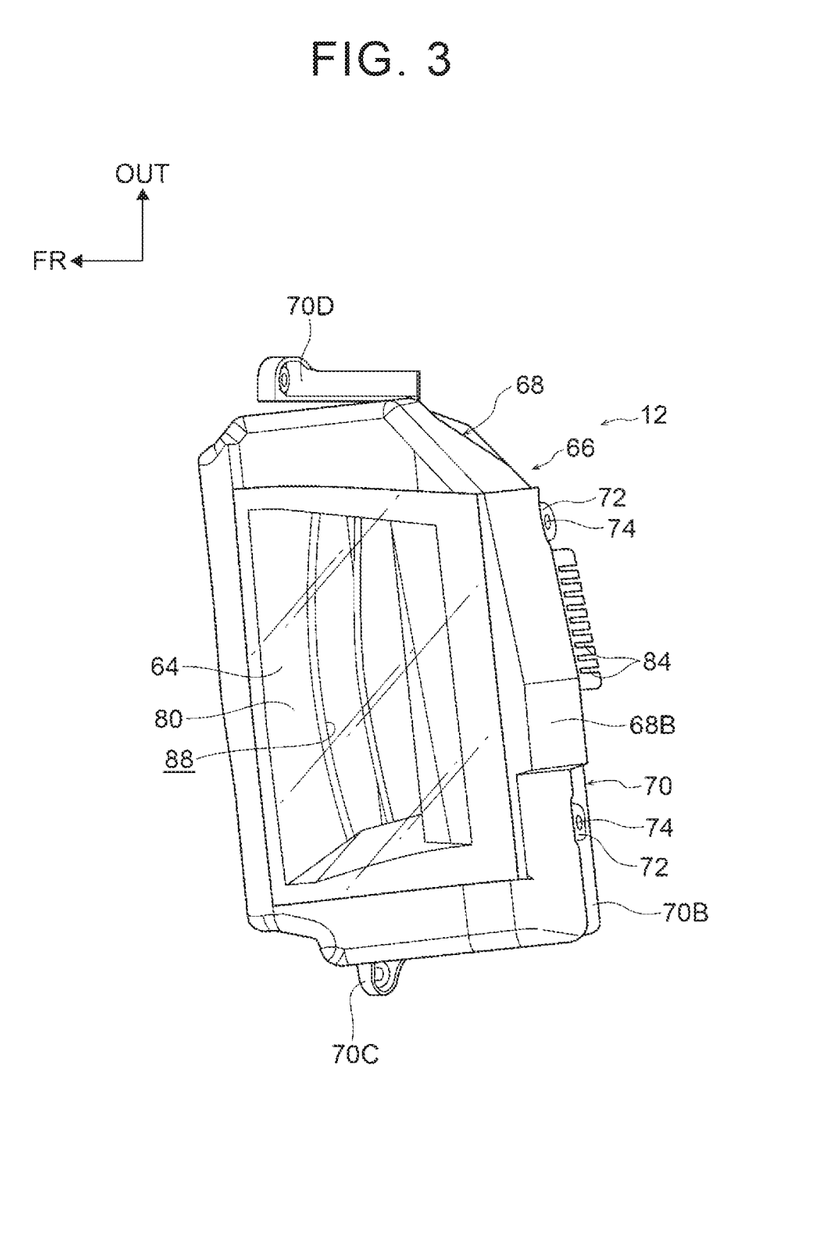
FIG. 3 is a plan view of the head-up display device according to the embodiment.

Here, as shown in FIG. 2, cowl reinforcements 58, 60 are provided on the rear side of the cowl panel 22 in the vehicle front-rear direction, while being separated from each other in the vehicle width direction with the head-up display device 12 interposed therebetween. The head-up display device 12 is fixed to first ends 58A, 60A of the cowl reinforcements 58, 60 in a longitudinal direction thereof via fixing portions 70C, 70D (see FIG. 3) described later and is fastened to the dash panel 28 via a bracket 73. FIG. 3 shows a plan view of the head-up display device 12.

Configuration of Head-Up Display Device

Next, the configuration of the head-up display device 12 will be described.

In brief, the head-up display device 12 shown in FIG. 1 is configured such that vehicle information (hereinafter referred to as "image information") is emitted as an image from a light source unit (light source) 62 composed of LEDs and the like, and the image information is displayed as a virtual image on the front windshield glass 18 through a transmission glass 64 provided in the upper wall 40 of the head-up display device 12 and an opening 16A of the instrument panel 16.

A casing 66 of the head-up display device 12 includes an upper case 68 constituting an upper part 66A of the casing 66 and a lower case 70 constituting a lower part 66B of the casing 66. Each of the upper case 68 and the lower case 70 has a generally rectangular shape in a plan view, which is long in the vehicle width direction, and is made from resin.

As shown in FIG. 1, the upper case 68 includes a lid portion 68A (right side in the drawing) constituting the upper wall 40 (left side in the drawing) of the head-up display device 12, and a wall (second wall) 68B (right side in the drawing) extending downward from an outer edge of the lid portion 68A and constituting the side wall 42 (left side in the drawing) of the head-up display device 12. The lower case 70 includes a bottom wall 70A (right side in the drawing) constituting the lower wall 44 (left side in the drawing) of the head-up display device 12 and a wall (first wall) 70B extending upward from an outer edge of the bottom wall 70A.

The upper wall 40 of the head-up display device 12 and the lid portion 68A of the upper case 68 indicate the same part, and the side wall 42 of the head-up display device 12 and the wall 68B of the upper case 68 indicate the same part, although described with different reference characters and designations for convenience of explanation. Similarly, the lower wall 44 of the head-up display device 12 and the bottom wall 70A of the lower case 70 also indicate the same part.

Further, in the casing 66 of the head-up display device 12, an outer dimension of the upper case 68 is set to be slightly larger than that of the lower case 70. The upper case 68 can be connected to the lower case 70 such that the wall 68B of the upper case 68 overlaps the wall 70B of the lower case 70 from outside.

More specifically, in the casing 66 of the head-up display device 12, a connecting piece (lower end of the wall 68B in the vehicle up-down direction) 72 extends downward from a lower edge of the wall 68B of the upper case 68. The connecting piece 72 overlaps, from outside, an upper end 70B1 of the wall 70B of the lower case 70 in the vehicle up-down direction. Although not shown, the upper case 68 is fixed to the lower case 70 via screws (connecting tools) 74 with connecting holes formed in the connecting piece 72 and connecting holes formed in the wall 70B of the lower case 70 aligned with each other.

The screws 74 are configured to be broken by a shearing force when an impact load F is input to the head-up display device 12 from the upper side in the vehicle up-down direction along a long dashed short dashed line P with the upper case 68 fixed to the lower case 70 via the screws 74.

The impact load F is set based on, for example, the Pedestrian Head Protection Performance Tests defined in the Japan New Car Assessment Program (JNCAP). That is, a load that acts on (is input to) the front windshield glass 18 when a head impactor 76, which is a collision body simulating the head of an adult or child, is projected from a testing machine to collide with the front windshield glass 18 is defined as the impact load F.

The lower case 70 of the head-up display device 12 is provided with at least the light source unit 62, a flat mirror 78, and a concave mirror 80. The light source unit 62 and the flat mirror 78 are accommodated in an accommodating portion 82 provided in the lower case 70. The concave mirror 80 is disposed at the front part 12A of the head-up display device 12 and below the support portion 46 in a vehicle up-down direction that passes through the support portion 46 supporting the front windshield glass 18 and that extends along a load input direction (long dashed short dashed line P) of the head impactor 76.

Figure 4:
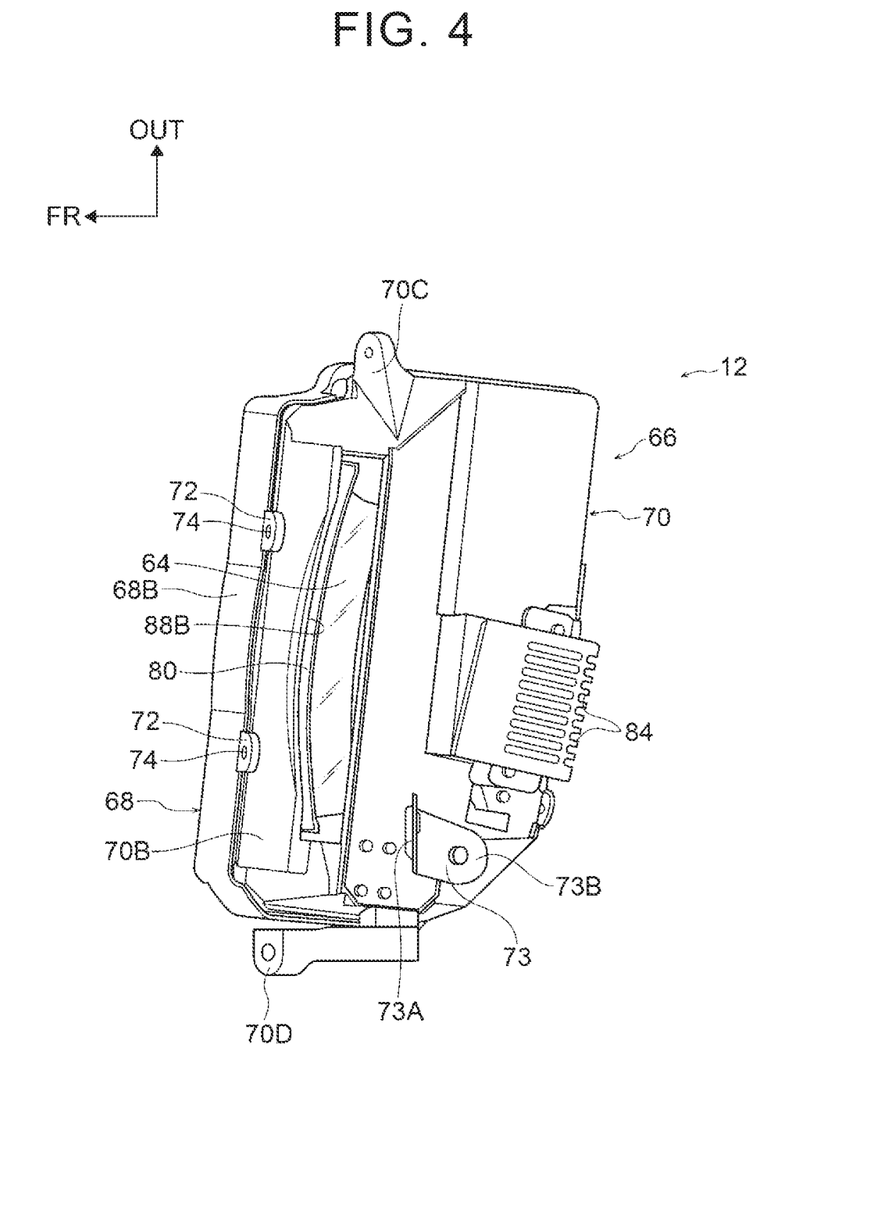
FIG. 4 is a bottom view of the head-up display device according to the embodiment.

Here, FIG. 4 shows a bottom view of the head-up display device 12. As shown in FIGS. 3 and 4, the accommodating portion 82 of the head-up display device 12 is provided with a plurality of vent holes 84 configured to release heat in the accommodating portion 82. The vent holes 84 are closed by a sheet or the like (not shown) that can dissipate heat and suppress entry of dust and the like.

Further, in the head-up display device 12, the accommodating portion 82 is closed by a cover 86 so that dust does not enter the accommodating portion 82, as shown in FIG. 1. The cover 86 is provided with a transmission glass 87 so as to transmit light. The light (image information) emitted from the light source unit 62 is refracted by the flat mirror 78, passes through the transmission glass 87, and is incident on the concave mirror 80 by a reflection mirror or the like (not shown).

The concave mirror 80 is made of highly transparent resin such as polycarbonate (PC) or glass. The light (image information) projected by the concave mirror 80 is transmitted toward the front windshield glass 18 as described above, and a virtual image is formed on the front windshield glass 18.

As described above, the lower case 70 of the head-up display device 12 is provided with the light source unit 62 that emits image information. Thus, a plate thickness, a material, and the like of the lower case 70 are set so as to obtain high rigidity in consideration of an influence of vibration and the like. The upper case 68 is formed to have lower rigidity than the lower case 70.

Thus, the upper case 68 is formed so as to have a smaller plate thickness than the lower case 70, or is formed of a material having a Young's modulus lower than that of the material of the lower case 70. The upper case 68 may be formed so as to satisfy both of these. In the present embodiment, the upper case 68 and the lower case 70 are made from resin, but not limited to this. The upper case 68 and the lower case 70 may be made of metal. Furthermore, the lower case 70 may be made of metal, and the upper case 68 may be made from resin.

Further, in the present embodiment, the bottom wall 70A of the lower case 70 of the head-up display device 12 is provided with an opening 88 on the lower side of the concave mirror 80 in the vehicle up-down direction. The opening 88 constitutes another part of the retraction portion 53 and has a rectangular shape that is long in the vehicle width direction. A rib 88A protrudes downward in the vehicle up-down direction from an inner edge of the opening 88.

The concave mirror 80 has a shape that bulges in a convex shape toward the front of the vehicle in a substantially plan view. Therefore, a curved portion 88B is provided at a front part of the opening 88 in the vehicle front-rear direction. The curved portion 88B bulges in a convex shape toward the front of the vehicle in the substantially plan view so as to conform with the shape of the concave mirror 80, as shown in FIG. 4. This enables the concave mirror 80 to pass through the opening 88 with a minimum necessary size.

As shown in FIGS. 3 and 4, the lower case 70 of the head-up display device 12 is provided with the fixing portions 70C, 70D. Of the fixing portions 70C, 70D, the fixing portion 70C is fixed to the cowl reinforcement 58 (see FIG. 2) and the fixing portion 70D is fixed to the cowl reinforcement 60 (see FIG. 2), via fastening members such as bolts.

As shown in FIG. 4, a first end 73A of the long plate-shaped bracket 73 in its longitudinal direction is fixed to the lower case 70 of the head-up display device 12. A second end 73B of the bracket 73 in its longitudinal direction is fixed to the dash panel 28 (see FIG. 2).

That is, in the present embodiment, the head-up display device 12 is fixed to (supported by) the cowl reinforcements 58, 60 and the dash panel 28 shown in FIG. 2. Note that the method of supporting the head-up display device 12 is not limited to this. For example, although not shown, the head-up display device 12 may be configured to be supported by the instrument panel reinforcement via a bracket or the like.

In the configuration described above, as shown in FIG. 1, the facing wall 52 of the cowl panel 22 is provided below the opening 88 formed in the lower case 70, with the head-up display device 12 provided to an inside 17 of the instrument panel 16 via the lower case 70. The retraction space 54 is provided between the bottom wall 70A of the lower case 70 (the lower wall 44 of the head-up display device 12) and the facing wall 52 of the cowl panel 22.

Operations and Effects of Head-Up Display Device

Here, operations and effects of the head-up display device 12 will be described.

As shown in FIG. 1, the head-up display device 12 is provided to the inside 17 of the instrument panel 16. The casing 66 of the head-up display device 12 is provided with the concave mirror 80 that projects the image information emitted from the light source unit 62 toward the front windshield glass 18.

Meanwhile, in the present embodiment, the retraction portion 53 is provided on the lower side of the concave mirror 80 in the vehicle up-down direction. The retraction portion 53 is provided to allow the concave mirror 80 to move downward in the vehicle up-down direction when the impact load F (see FIG. 5) is input to the head-up display device 12 from above the vehicle via the front windshield glass 18.

Suppose, as a comparative example (not shown), the impact load F is input from above the vehicle to the head-up display device 12, but the concave mirror 80 is held as it is and does not move downward in the vehicle up-down direction. In this case, deformation of the casing 66 of the head-up display device 12 is suppressed by a reaction force of the concave mirror 80.

Thus, if the deformation of the casing 66 of the head-up display device 12 is suppressed, the downward movement (deformation) of the front windshield glass 18, the instrument panel 16, the cowl panel 22, and the like in the vehicle up-down direction is also suppressed. Therefore, in the comparative example, there is a possibility that the impact energy cannot be sufficiently absorbed when the impact load F is input to the front windshield glass 18 from above the vehicle.

In contrast, in the present embodiment shown in FIG. 1, the retraction portion 53 that allows the concave mirror 80 to move downward in the vehicle up-down direction is provided on the lower side of the concave mirror 80 in the vehicle up-down direction, as described above. Thus, as shown in FIG. 5, when the impact load F is input to the head-up display device 12 from the upper side in the vehicle up-down direction via the front windshield glass 18, the concave mirror 80 can move downward in the vehicle up-down direction.

Figure 5:
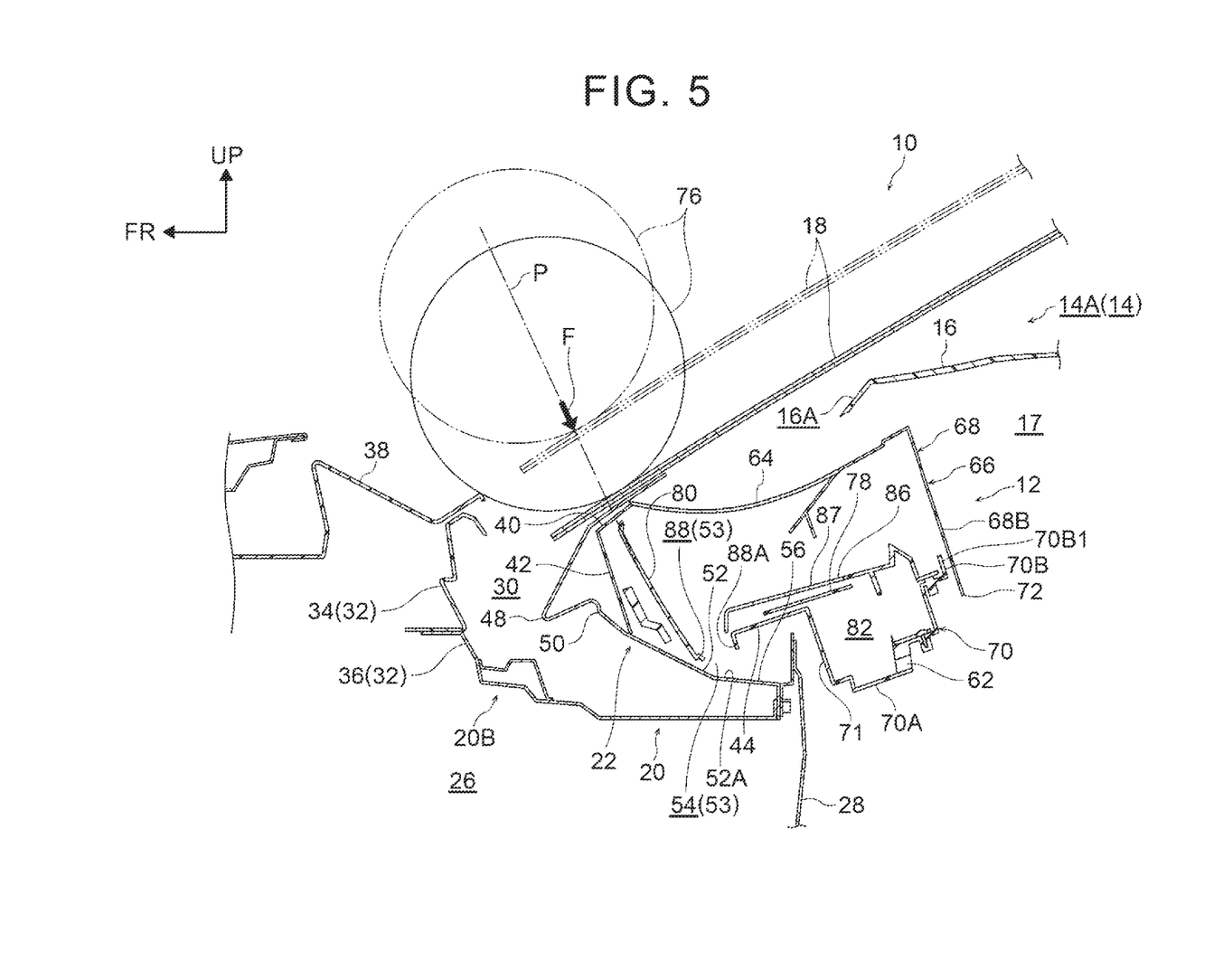
FIG. 5 is an operation diagram showing the front part of the cabin of the vehicle, on which the head-up display device according to the embodiment is mounted, before and after the impact load is input, taken along the vehicle up-down direction and the vehicle front-rear direction.

FIG. 5 is an operation diagram showing the front part 14A of the cabin 14 of the vehicle 10 before and after the impact load F is input, taken along the vehicle up-down direction and the vehicle front-rear direction. Long dashed double-short dashed lines indicate a state before the input of the impact load F, and solid lines indicate a state after the input of the impact load F.

That is, in the present embodiment, as shown in FIG. 5, the front windshield glass 18, the instrument panel 16, the cowl panel 22, and the like can be deformed downward in the vehicle up-down direction without being intercepted by the concave mirror 80. Thus, in the present embodiment, by moving the concave mirror 80 downward in the vehicle up-down direction to sufficiently deform the front windshield glass 18, the instrument panel 16, the cowl panel 22, and the like, it is possible to effectively absorb the impact energy.

Therefore, unlike a comparative example (not shown) in which the head-up display device is configured such that the casing is broken at the fragile portion to absorb impact energy, it is possible to secure the rigidity of the casing 66 itself of the head-up display device 12 in the present embodiment. Therefore, in the present embodiment, the head-up display device 12 can suppress jitters of the image information during traveling of the vehicle 10.

Thus, in the present embodiment, the head-up display device 12 can suppress jitters of the image information during traveling of the vehicle 10, and can absorb the impact energy when the impact load F is input from the upper side in the vehicle up-down direction. Thus, according to the embodiment, with the absorption of the impact energy, it is possible to reduce the reaction force to the pedestrian, thereby reducing the impact acting on the pedestrian.

In particular, when the entire head-up display device 12 is covered with a metal such as the cowl panel 22 etc., it is difficult to move the entire head-up display device 12 downward in the vehicle up-down direction. Thus, with at least the concave mirror 80 configured to move downward in the vehicle up-down direction, an effect of reducing the impact to the pedestrian's head is expected to be obtained.

In other words, in the present embodiment, the casing 66 of the head-up display device 12 can realize two contradictory performances, i.e., higher rigidity for suppressing jitters of the image information and lower rigidity for protecting pedestrians.

Here, the downward movement of the concave mirror 80 in the vehicle up-down direction will be specifically described. In the present embodiment, the casing 66 of the head-up display device 12 includes the upper case 68 constituting the upper part of the casing 66 and the lower case 70 constituting the lower part of the casing 66, and the retraction portion 53 includes the opening 88 formed in the bottom wall 70A of the lower case 70. Thus, by providing the opening 88 in the bottom wall 70A of the lower case 70, the concave mirror 80 can pass through the opening 88 formed in the lower case 70 when the casing 66 is deformed and the concave mirror 80 moves downward in the vehicle up-down direction.

As shown in FIG. 5, when the impact load F is input to the head-up display device 12 from above the vehicle via the front windshield glass 18, the casing 66 of the head-up display device 12 is deformed. That is, the casing 66 is deformed from the upper part side toward the lower part side. At this time, the concave mirror 80 attempts to move downward in the vehicle up-down direction with the deformation of the casing 66. The concave mirror 80 moves downward in the vehicle up-down direction through the opening 88 formed in the bottom wall 70A of the lower case 70, so that the casing 66 can be deformed without being intercepted by the concave mirror 80.

Furthermore, in the present embodiment, the rib 88A protrudes downward in the vehicle up-down direction from the inner edge of the opening 88. Thereby, the rigidity around the opening 88 is improved. Therefore, the deformation of the opening 88 due to the deformation of the casing 66 can be suppressed.

Further, with the rib 88A protruding downward in the vehicle up-down direction from the inner edge of the opening 88, the concave mirror 80 can be guided toward the cowl panel 22 along the rib 88A when passing through the opening 88. The rib 88A is not necessarily required.

In the present embodiment, the outer dimension of the upper case 68 of the head-up display device 12 is set to be slightly larger than the outer dimension of the lower case 70. The connecting piece 72 extending downward from the wall 68B of the upper case 68 is connected to the lower case 70 so as to overlap, from outside, the upper end 70B1 of the wall 70B of the lower case 70. Further, the screws 74 that connect the upper case 68 and the lower case 70 are configured to be broken by a shearing force when the impact load F is input to the casing 66 of the head-up display device 12 from above the vehicle.

As described above, the wall 68B of the upper case 68 is disposed so as to overlap the wall 70B of the lower case 70 from outside to be connected thereto by the screws 74. Thus, when the screws 74 are broken, the upper case 68 moves toward the lower case 70 (downward in the vehicle up-down direction). As a result, the concave mirror 80 moves downward in the vehicle up-down direction.

That is, in the present embodiment, the screws 74 that connect the lower case 70 and the upper case 68 are broken to reduce the volume of the casing 66, so that the amounts of deformation (deformation strokes) of the front windshield glass 18, the instrument panel 16, the cowl panel 22, and the like are increased, thereby increasing the amount of impact energy to be absorbed.

Therefore, unlike the comparative example (not shown) in which the head-up display device is configured such that the casing is broken at the fragile portion to absorb impact energy, the front windshield glass 18, the instrument panel 16, the cowl panel 22, and the like are deformed to absorb the impact energy in the present embodiment. Thus, in the present embodiment, the rigidity of the casing 66 itself of the head-up display device 12 can be secured.

In the present embodiment, the cowl 20 extends along the vehicle width direction at the front part of the front windshield glass 18 in the vehicle front-rear direction, and the cowl 20 covers the front part 12A of the head-up display device 12 from outside.

Here, as described above, in the present embodiment, the bottom wall 70A of the lower case 70 of the head-up display device 12 is provided with the opening 88 constituting a part of the retraction portion 53. The opening 88 allows the concave mirror 80 to move downward in the vehicle up-down direction when the impact load F is input to the concave mirror 80 from above the vehicle.

Meanwhile, the retraction space 54 constituting another part of the retraction portion 53 is secured between the facing wall 52 and the bottom wall 70A of the lower case 70. The facing wall 52 constitutes a part of the cowl 20 and is provided below the bottom wall 70A of the lower case 70. The retraction portion 53 allows the concave mirror 80 that has passed through the opening 88 to move downward in the vehicle up-down direction.

In other words, in the present embodiment, the retraction space 54 that allows the concave mirror 80 that has passed through the opening 88 to move downward in the vehicle up-down direction is provided between the bottom wall 70A of the lower case 70 and the facing wall 52 of the cowl 20.

Thus, since the retraction space 54 is provided between the bottom wall 70A of the lower case 70 and the facing wall 52 of the cowl 20, the concave mirror 80 can accordingly move further downward in the vehicle up-down direction, compared to the case where the retraction space 54 is not provided (not shown). As a result, the amounts of downward deformation of the front windshield glass 18, the instrument panel 16, the cowl panel 22, and the like in the vehicle up-down direction increase, thereby increasing the amount of impact energy to be absorbed accordingly.

Further, in the present embodiment, the facing wall 52 of the cowl 20 is provided with the deflection face 56. The deflection face 56 is configured to convert the downward movement of the concave mirror 80 in the vehicle up-down direction into a rearward movement in the vehicle front-rear direction. The facing wall 52 of the cowl 20 is provided below the bottom wall 70A of the lower case 70 in the vehicle up-down direction. As described above, the retraction space 54 is provided between the bottom wall 70A of the lower case 70 and the facing wall 52 of the cowl 20.

Here, in order to increase the amounts of downward deformation of the front windshield glass 18, the instrument panel 16, the cowl panel 22, and the like in the vehicle up-down direction, it is only necessary to set the retraction space 54 to be large. In other words, it is only necessary to largely separate the bottom wall 70A of the lower case 70 and the facing wall 52 of the cowl 20. In this case, however, the size of the cowl 20 increases and the weight of the vehicle increases accordingly.

In contrast, in the present embodiment, the facing wall 52 of the cowl 20 is provided with the deflection face 56, so that the downward movement of the concave mirror 80 in the vehicle up-down direction is converted into the rearward movement in the vehicle front-rear direction. As a result, the front windshield glass 18, the instrument panel 16, the cowl panel 22, and the like can be effectively deformed downward in the vehicle up-down direction, with the retraction space 54 having a minimum necessary length in the vehicle up-down direction. However, the deflection face 56 is not necessarily required.

Supplementary Description of the Present Embodiment

In the present embodiment, the opening 88 is provided in the bottom wall 70A of the lower case 70 as the retraction portion 53, as shown in FIG. 1. However, the disclosure is not limited to this, as long as the downward movement of the concave mirror 80 in the vehicle up-down direction is not intercepted when the impact load F is input from above the vehicle.

For example, the opening 88 is not necessarily an opening, and may be closed by a member having a lower strength than the lower case 70, such as a tape, a thin plate, etc. in order to suppress entry of dust or the like. When the rib 88A is provided at the inner edge of the opening 88, a tape, a thin plate, etc. is provided at an end of the rib 88A.

Further, the opening 88 need not necessarily be provided in the bottom wall 70A of the lower case 70 as the retraction portion 53. For example, although not shown, the bottom wall 70A of the lower case 70 may be provided with a recess that protrudes downward in the vehicle up-down direction and allows the concave mirror 80 to move downward in the vehicle up-down direction.

Further, in the present embodiment, in the casing 66 of the head-up display device 12, the upper case 68 includes the lid portion 68A and the wall 68B, and the lower case 70 includes the bottom wall 70A and the wall 70B. However, the upper case 68 only needs to be movable downward in the vehicle up-down direction with respect to the lower case 70, so its shape, configuration, and the like are not limited to the above. For example, in the lower case 70, the wall 70B is not necessarily required.

Furthermore, in the present embodiment, the upper case 68 is fixed to the lower case 70 via the screws 74 serving as the connecting tools. However, it is only necessary that the connecting tools are configured to be broken when the impact load F is input to the head-up display device 12, so the screws 74 need not necessarily be adopted. For example, instead of the screws 74, clips or the like that come off with breakage may be used.

Furthermore, the connecting tools are not limited to those described above. For example, although not shown, the wall 68B of the upper case 68 may be provided with claw portions. In this case, the claw portions are engaged with the wall 70B of the lower case 70 and are broken when the impact load F is input.

Although the exemplary embodiment of the disclosure has been described above, embodiments of the disclosure is not limited to the above. An embodiment may be appropriately combined with various modifications, and needless to say, the disclosure can be carried out in various modes without departing from the scope of the disclosure.

What is claimed is:

1. A head-up display device comprising:
a casing provided inside an instrument panel and provided with a concave mirror configured to project image information emitted from a light source onto a front windshield glass, wherein
a retraction portion is provided on a lower side of the concave mirror in a vehicle up-down direction and configured to allow the concave mirror to move downward in the vehicle up-down direction when an impact load is input to the concave mirror from an upper side of the casing in the vehicle up-down direction.

2. The head-up display device according to claim 1, wherein:
the casing includes an upper case constituting an upper part of the casing and a lower case constituting a lower part of the casing; and
the retraction portion is provided at a position including an opening that is provided in a lower wall of the lower case.

3. The head-up display device according to claim 2, wherein
the casing further includes
a first wall constituting a part of the lower case and extending along the vehicle up-down direction,
a second wall constituting a part of the upper case, extending along the vehicle up-down direction, and overlapping the first wall from outside, and
a connecting tool connecting an upper end of the first wall in the vehicle up-down direction and a lower end of the second wall in the vehicle up-down direction and configured to be broken when the impact load is input to the casing from the upper side of the casing in the vehicle up-down direction.

4. The head-up display device according to claim 2, wherein a rib protrudes downward in the vehicle up-down direction from an inner edge of the opening.

5. The head-up display device according to claim 2, wherein the concave mirror is provided in the lower case.

6. The head-up display device according to claim 2, wherein:
the concave mirror has a shape that bulges in a convex shape toward a front of a vehicle in a plan view of the vehicle; and
at least a front part of the opening in a vehicle front-rear direction has a curved shape that bulges in a convex shape toward the front of the vehicle in the plan view of the vehicle.

7. The head-up display device according to claim 2, wherein the lower case has higher rigidity than the upper case.

8. A mounting structure for a head-up display device, the mounting structure comprising:
the head-up display device including a casing that is provided inside an instrument panel and is provided with a concave mirror configured to project image information emitted from a light source onto a front windshield glass; and
a cowl panel extending along a vehicle width direction at a front part of the front windshield glass in a vehicle front-rear direction, and covering a front part of the head-up display device in the vehicle front-rear direction from outside the head-up display device, wherein:
a lower wall of the casing of the head-up display device is provided with an opening that allows the concave mirror to move downward in a vehicle up-down direction when an impact load is input to the concave mirror from an upper side in the vehicle up-down direction; and
the cowl panel includes a facing wall constituting a part of the cowl panel, disposed below the lower wall in the vehicle up-down direction, and disposed such that a retraction space is secured between the facing wall and the lower wall, the retraction space allowing the concave mirror that has passed through the opening to move downward in the vehicle up-down direction.

9. The mounting structure according to claim 8, wherein the facing wall includes a deflection face configured to convert a downward movement of the concave mirror in the vehicle up-down direction into a rearward movement in the vehicle front-rear direction.

10. The mounting structure according to claim 8, wherein:
a first cowl reinforcement and a second cowl reinforcement are attached to the cowl panel, with the head-up display device interposed between the first cowl reinforcement and the second cowl reinforcement, on a rear part of the cowl panel in the vehicle front-rear direction; and
the head-up display device includes a first fixing portion that is fixed to the first cowl reinforcement and a second fixing portion that is fixed to the second cowl reinforcement.

* * * * *